United States Patent

Rushing et al.

[11] 3,888,562
[45] June 10, 1975

[54] OSCILLATING SCANNER

[75] Inventors: Frank C. Rushing, Columbia; Gordon S. Ley, Arnold, both of Md.

[73] Assignee: Westinghouse Electric Corporation, Pittsburgh, Pa.

[22] Filed: Feb. 6, 1973

[21] Appl. No.: 330,163

[52] U.S. Cl. .................... 350/7; 350/285; 250/234
[51] Int. Cl. .......................................... G02b 17/00
[58] Field of Search .................... 350/6, 7, 172, 285; 178/7.6; 250/234, 135; 74/25, 40

[56] References Cited
UNITED STATES PATENTS

| | | | |
|---|---|---|---|
| 3,428,812 | 2/1969 | Burke | 350/7 |
| 3,436,546 | 4/1969 | Derderian | 350/7 |
| 3,589,792 | 6/1971 | Kurotschka | 350/7 |
| 3,733,133 | 5/1973 | Chapman | 350/7 |
| 3,734,591 | 5/1973 | Howe | 350/6 |

*Primary Examiner*—Ronald L. Wibert
*Assistant Examiner*—Michael J. Tokar
*Attorney, Agent, or Firm*—D. F. Straitiff

[57] ABSTRACT

An oscillating scanner including a mechanism for oscillating a mirror at large amplitudes of, for example, plus and minus one radian. A spiral spring is connected at one end to a driven support body for the mirror and at the other end to a counterbalance body. The driven and counterbalance bodies are concentrically mounted by bearings for oscillation upon a foundation mounted shaft. Drive means, situated in a mechanically parallel relationship with the spring, supplies energy in a cyclic manner to the system for maintaining a constant oscillation amplitude by replacing energy losses. The oscillating scanner further includes an iris diaphragm with a controlled opening to suit the viewing requirements over the range of viewing angles.

12 Claims, 11 Drawing Figures

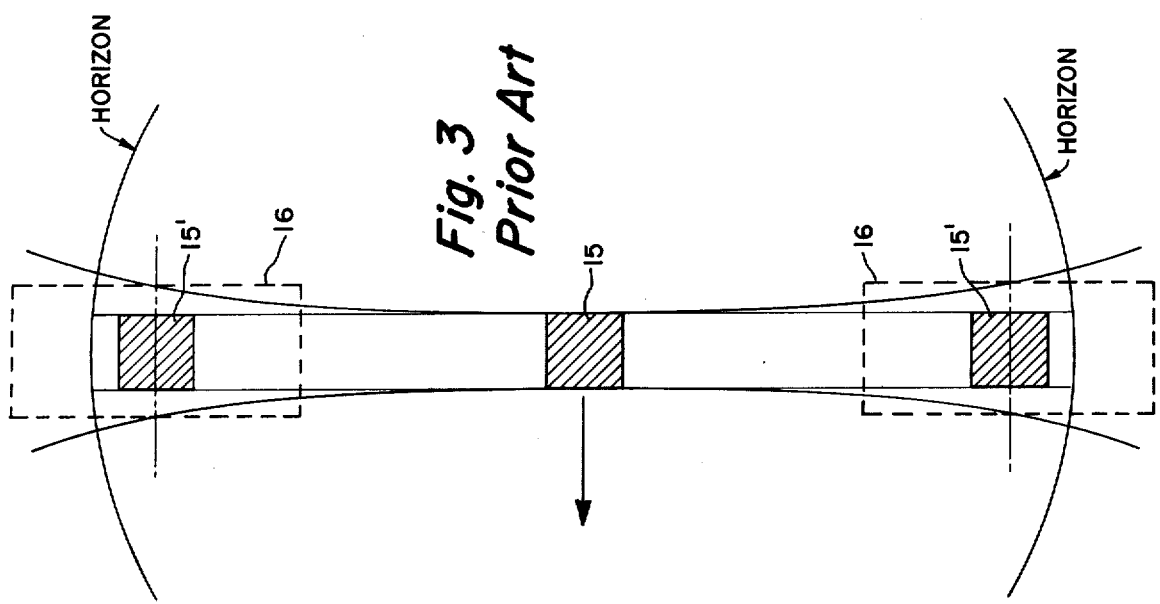
Fig. 3
Prior Art
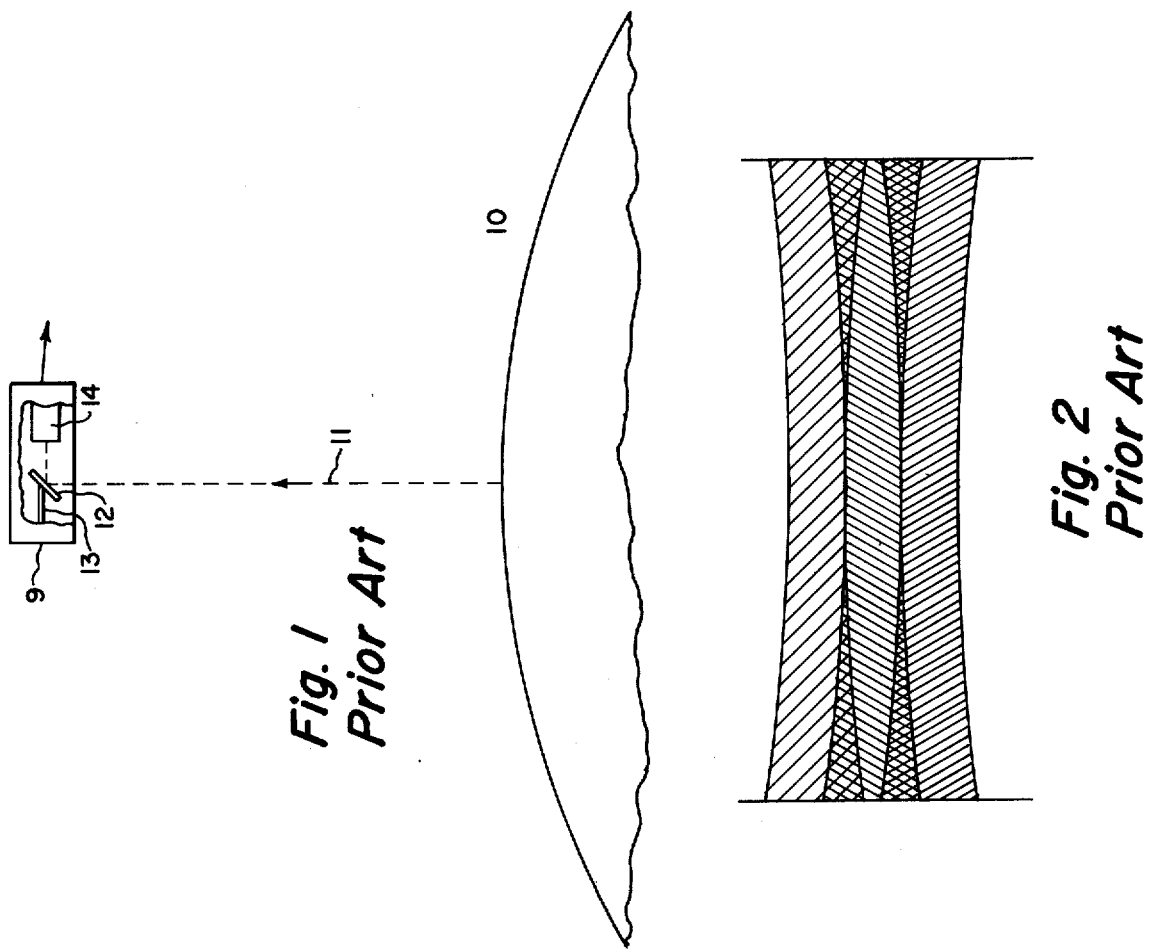
Fig. 1
Prior Art
Fig. 2
Prior Art

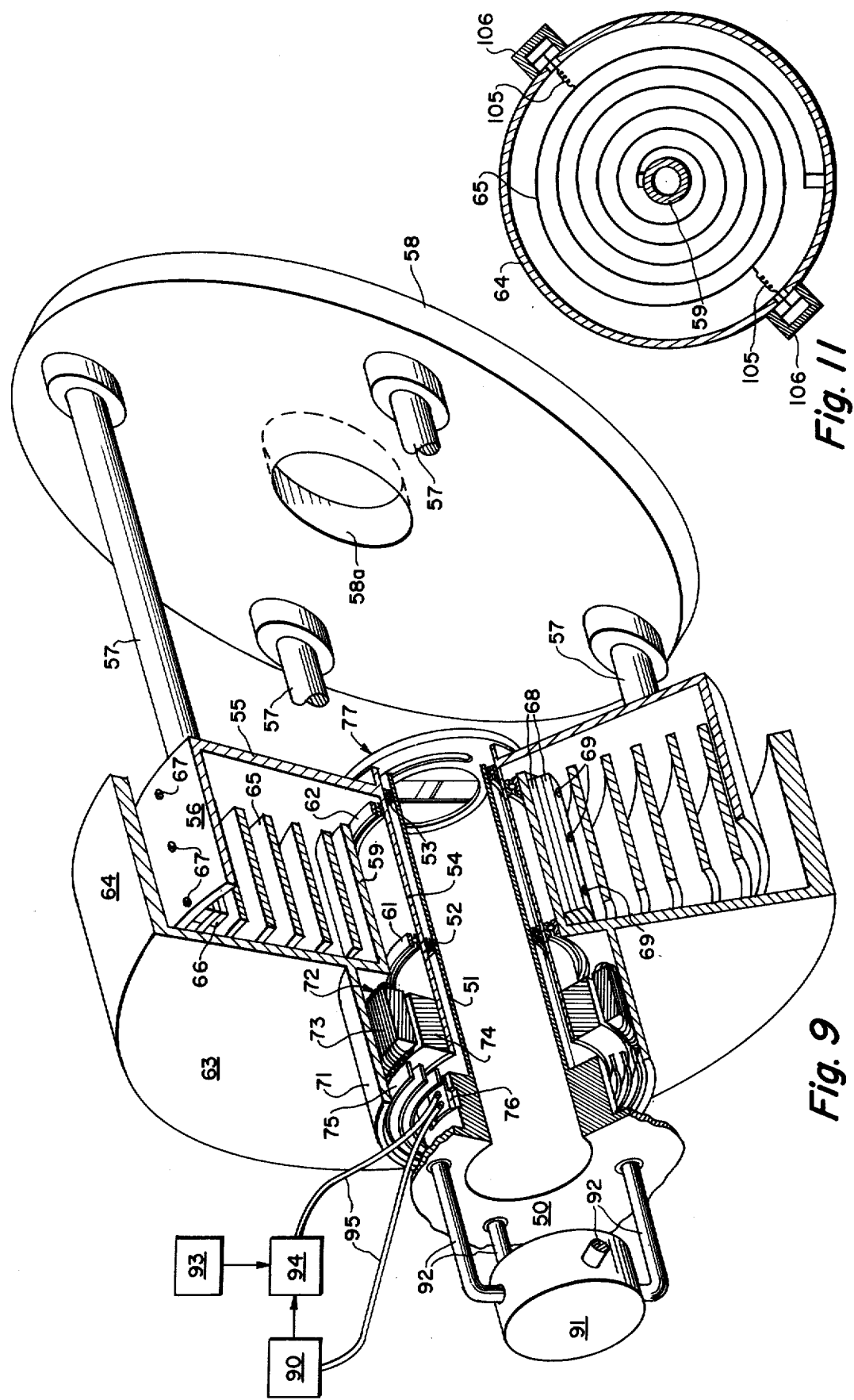

OSCILLATING SCANNER

BACKGROUND OF THE INVENTION

Satellite or spacecraft borne mapping systems will soon be using a line scanner imaging system for visual or infrared information or both. These scanners presently incorporate sensing devices for mapping a scene through the process of sensing sequenced lines across the scene to make a pictorial display, for example, from an earth-orbiting satellite. Typically, these devices employ a mirror inclined at 45° from the velocity vector which describes the direction of spacecraft travel. The mirror is mounted for rotation about an axis parallel to the direction of spacecraft travel. As the mirror rotates at constant angular velocity, it will scan the earth from horizon-to-horizon and reflect the varying light intensity into a sensor provided within the spacecraft. On a second or subsequent sweep, it will scan a different line because of the travel of the spacecraft.

An earth-orbiting satellite in nearly a polar orbit at an altitude of 600 miles, for example, should have a scan angle of 49° or approximately one radian each side of nadir in order to achieve sufficient coverage of a scene. At the scan extremes, i.e., at plus and minus 49° from nadir, a ground spot illuminating the field of view is 3.81 times as long in the scan direction and 1.76 times as wide in the track direction as a ground spot at nadir. As a result, the ground resolution is non-uniform in both the track and crosstrack directions. If the scan rate is selected in relation to the velocity of the spacecraft to achieve continuous ground coverage at nadir, it will result in overlapped and ambiguous data near the scan extremes.

The underlying and principal objective of the scanning system presently under discussion is to obtain both constant and high quality ground resolution. This is not achieved by the known scanning systems due to their lack of uniformity in the exposure time per unit area of the scene. The exposure time varies with the position of the mirror in its circular path of movement such that the exposure time is maximum when the mirror is looking straight down at nadir and minimum when the mirror is looking at the horizon. Thus, with an objective of viewing a given unit area, it turns out that the area continually changes as to size from a minimum when looking straight down at nadir and a maximum when looking at a more distant horizon due to the angle away from nadir and the curvature of the earth. Moreover, such a scanning system results in a very inefficient use of the scanner equipment since it is utilized only for about 33 percent of the time because for about two-thirds of the time, the rotating mirror is looking up into the satellite. Scanning at constant angular velocity contributes in a material manner to the poor resolution of the ground coverage even when the mirror is rotated at several hundred revolutions per minute. It is conceivable that to improve the ground resolution, a rotation controlled iris may be arranged in the focal plane of the mirror. With a constant angular mirror velocity and no iris control, scanners will provide a data rate that varies over a range of approximately 3.8 to 1 during each scan. The data rate is defined as the rate of scanning across picture elements having a given unit of length on the ground.

In principle, it is conceivable to achieve a constant ground resolution and constant data rate by controlling the angular velocity of the rotating mirror so that it is proportional to the instantaneous field of view. Unfortunately, the inertia of the mirror and associated structure requires substantial quantities of power to achieve significant velocity changes during each of the scan cycles, which is impractical to supply from an orbiting spacecraft even if a control system could be developed.

SUMMARY OF THE INVENTION

The present invention provides a scanner system designed to oscillate a mirror for a sensor with a substantially simple harmonic motion about nadir at an amplitude in the order of one radian with great precision to enable a sensing device to map a scene with great resolution and produce a high quality pictorial display of the scene. The employment of a simple harmonic motion for the scanner system has the feature that the motion of the mirror is at a maximum velocity at nadir with a decreasing velocity at each extreme to zero at the point in travel where the motion changes direction. It has been found that this motion nearly matches and closely conforms to the requirement of equal exposure time of a given ground unit area throughout the entire path of travel of the mirror. It has also been found that simple harmonic motion of the scanner mirror greatly improves the duty cycle to the extent of approaching 100 percent utilization, if desired.

Specifically, the present invention provides a reflecting scanner system driven by a mechanism that oscillates with a simple harmonic motion, preferably at the natural frequency of the mechanism. The oscillating mechanism includes spring means connected between the support structure of the reflector and a counterbalance. The mechanism oscillates about a foundation-mounted shaft having bearings which rotatably carry the reflector support structure and the counterbalance. Drive means are connected in a torque-transmitting relation between the reflector support structure and the counterbalance for supplying energy in a cyclic manner to the spring to overcome small losses in energy due to friction and inefficiency in the system. An energy ray signal is directed by the reflector through an iris diaphragm having an aperture which is controlled as to its size during each oscillation cycle to vary from a maximum at the oscillation midpoint to a minimum at the oscillation extremes. In one form, the aperture size is controlled from the harmonic motion of the oscillating bodies through the use of cams.

These features and advantages of the present invention as well as others will be more fully understood when the following description is read in light of the accompanying drawings, in which:

FIG. 1 illustrates schematically a prior art form of a continuously rotating scanning system;

FIG. 2 is a representation of the scanning lines across a scene produced by the scanning system shown in FIG. 1;

FIG. 3 is a representation illustrating the problems involved when mapping a scene along a circular or spherical body;

FIG. 9 is a pictorial representation of one embodiment of an oscillating scanner incorporating the features of the present invention;

FIG. 11 is a schematic illustration of a damper for random vibration of the oscillating scanner.

Figure 10:
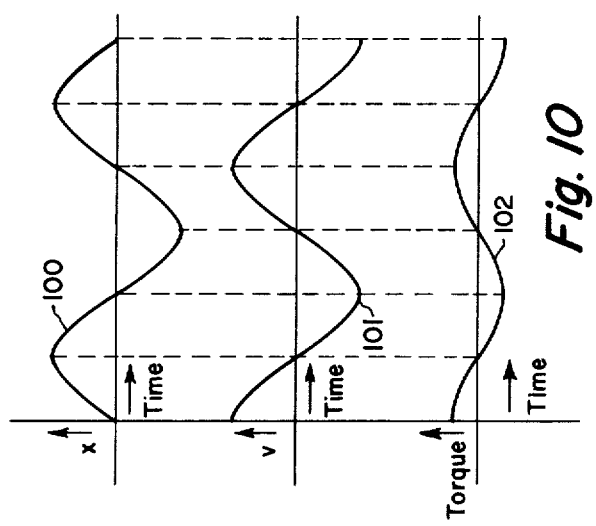
FIG. 10 represents series of graphs illustrating the motion dynamics of the oscillating scanner system.

Referring to FIG. 1, there is illustrated, according to prior art, a satellite 9 in an assumed polar orbit, traveling in the direction shown, about the earth 10. Light from the earth is reflected along line 11 to an inclined mirror 12 supported in the satellite. The mirror is secured to a shaft 13 which is continuously rotated by a motor, not shown. The mirror will scan a scene from the earth and reflect the light rays to a sensor 14. The signal received by the sensor 14 is represented in FIG. 2 wherein the hatched bars represent the signal data produced during mapping of a scene with a duty cycle of 33 percent of the time available in a 100 percent duty cycle. The mirror with its constant angular rotation always sweeps a scene in the same direction. The field of view flairs out at the beginning and end of the sweep. This contributes to ambiguous data due to the overlapping coverage of the scene. In addition, the problem with the low duty cycle is that the signal to noise ratio is impaired. Less energy is available from each ground element since it is in view one third of the time available in a 100 percent duty cycle. Also, the detector noise bandwidth, and hence noise level, is higher because of the need to measure the same number of data points in a shorter time.

FIG. 3 best illustrates the underlying difficulties when employing a continuouly rotating mirror for a scanning system. Let it be assumed, with respect to FIG. 3, that a unit area 15 on the earth is viewed at nadir between the two horizons, from a spacecraft while moving with a velocity vector in the direction of the arrow. As the mirror focuses on the unit area 15 while the mirror rotates toward one of the horizons, the unit area 15 has been transposed to the horizon shown in the drawings as 15'. At the horizon, the area 15 actually turns out to be an area having the size represented by the rectangle 16. This occurs as a function of both the curvature of the earth and the viewing angle of the mirror to the horizon with respect to nadir. FIGS. 1 and 3 assist in an appreciation that the exposure time to light reflected from the area 15 at nadir greatly exceeds the exposure time to light reflected from the area 16 since the mirror views area 16 for a much shorter time due to the mirror's constant rotational speed. With the foregoing discussion in mind concerning the problems involved when employing a continuously rotating mirror-type scanner, the present invention provides an oscillating-type scanner which is designed to overcome these problems.

Figure 4:
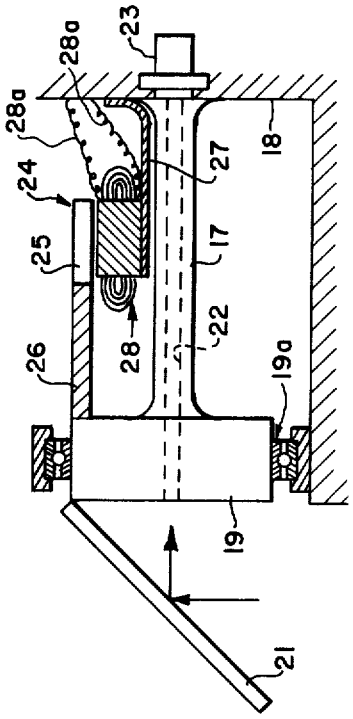
FIG. 4 is a simplified mechanical schematic of one form of oscillating system according to the present invention.

FIG. 4 illustrates schematically a simplified form of the present invention wherein there is provided a torsion spring 17 secured at one end to the foundation 18 of the spacecraft. To the extended end of the spring there is attached a circular body 19 to form a driven mass for storing kinetic energy with respect to the foundation and torsion spring system. Bearings 19a supported on the foundation carry the driven body 19 for concentric oscillation with respect to the axis of the spring 17. The driven body 19 supports a mirror 21 which has a concave reflecting surface, not illustrated, to concentrate the reflected light into a beam that is directed through a hole 22 drilled through the body 19 and along the axis of the torsion spring 17. A light sensor 23 is positioned in the path of the light beam within a recess formed in the foundation 18. The mirror 21 oscillates with simple harmonic motion with an amplitude, for example, up to 60° through the transfer of potential and kinetic energy between the body 19 and the spring 17, the latter having a preselected torsional constant to produce a natural frequency of oscillation with such an amplitude. Since in all known oscillating systems there are inefficiencies which dampen oscillating motion, a driver 24 is employed to replace energy losses to the system. This driver consists of a permanent magnet 25 extending from the body 19 by a bracket 26 whereby the magnet oscillates with the motion of the mirror 21. A bracket 27 from the foundation 18, supports a coil 28 which has wires 280a extending therefrom toward the foundation. These wires are connected to a controlled power supply to energize the coil 28 in a phased relation with the oscillation of the mirror.

Figure 5:
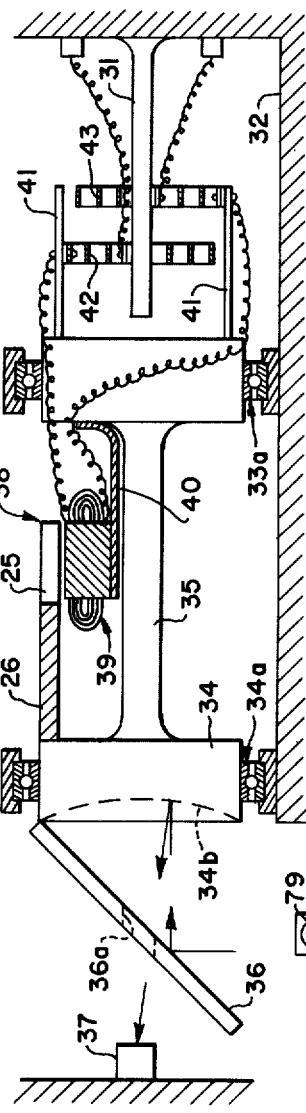
FIG. 5 is a simplified mechanical schematic of a second form of oscillating system according to the present invention.

FIG. 5 is a second simplified schematic of a mechanical system wherein the reaction force to the oscillating motion of the mirror produces a counter-oscillating motion in a counterweight in a manner to isolate the reaction forces from the foundation. A thin, relatively limber, torsion spring 31 is secured to the foundation 32. Spaced from the extended end of the torsion spring 31 is a counterweight 33 which is coupled to a driven body 34 by a torsion spring 35. Foundation supported bearings 33a and 34a carry the counterweight 33 and driven body 34, respectively. The driven body 34 supports a mirror 36 arranged at an angle of 45° to the oscillation axis of the torsion spring 35 to reflect light toward the end surface 34b of the driven body. The surface 34b is formed as a concave mirror which concentrates the light into a beam. The light beam is directed through an opening 36a in the mirror 36 to a sensor 37. A driver 38 is constructed in the manner as previously described with respect to the driver 24, with the exception that the coil 39 is supported by a bracket 40 extending from the counterbalance 33. The electrical wires for the coil 39 are connected to terminals carried by brackets 41 extending diametrically opposed from the counterbalance 33. These terminals are connected electrically to spaced-apart spiral springs 42 and 43 having their free ends attached to the torsion spring 31 at points spaced 180° apart from each other from where lead wires extend to junction terminals on the foundation. The springs 42 and 43 additionally serve as centering springs for orienting the mirror 36 with respect to the nadir or zero displacement position of the oscillation frequency. While FIG. 5 is a schematic illustration, it is pointed out that the centering springs 42 and 43 along with the torsion spring 31 are designed with a torque capacity sufficient to overcome bearing friction under dynamic conditions within an allowable error. It should be pointed out that with springs 42 and 43 the torsion spring is optional. The torque capacity of the springs 42 and 43 along with spring 31, if provided, should be selected to be of negligible stiffness as compared to the torsional constant of the torsion spring 35.

FIG. 9 illustrates one embodiment of the present invention employing many mechanical equivalents to the elements illustrated schematically in FIGS. 4 and 5. In FIG. 9, there is provided a tubular shaft 51 extending from the foundation 50 of a satellite and rigidly connected thereto. Bearings 52 and 53 are arranged on the outside surface of the shaft 51. These bearings rotatably support a tube 54 in a coaxially concentric relationship with the shaft 51. The tube 54, at its extended end, has a radially-extending wall 55 which carries a rim 56. Extending from the wall 55 is a plurality of pedestals 57 for securing a mirror 58 for simple harmonic oscillation along with the wall 55, rim 56 and tube 54.

An inner rim 59 is rotatably mounted by bearings 61 and 62 in a coaxial relation on the outside surface of the tube 54. Extending in a radial direction from the rim 59 is a wall 63 which terminates with an outer rim 64 that extends in the direction toward the mirror and in a nested relation with respect to the rim 56. The wall 63 and outer rim 64 together define a mass which forms a counterbalance or reaction body to the harmonic oscillation forces produced by the driven or primary body defined by the wall 55, rim 56, pedestals 57 and mirror 58. A spiral wound spring 65 is secured at one of its ends by clamp blocks 66 and screws 67 passing through the rim 56. The spring 65, at its inner end, is secured to the inner rim 59 by clamp blocks 68 and screws 69 passing through the inner rim.

A sleeve 71 projects from the wall 63 in a direction toward the foundation and in a concentric relation with respect to the tube 54. Arranged between sleeve 71 and tube 54 is a driver 72 consisting of a controlled flux producing outer drive coil 73 attached to the sleeve 71. A two-pole permanent magnet 74 forms an inner flux producing member which is secured to the tube 54. Two spiral wound, interlaced centering springs 75 are secured at their outer ends to the sleeve 71 at diametrically-opposed locations, not shown. The springs 75, at their inner ends, are secured by one of two insulated brackets 76 to the shaft 51 at diammetrically opposed locations. The centering springs are constructed from a material and in a manner selected to provide a required torque capacity to overcome bearing frictions under the dynamic conditions within an allowable error. These springs are preferably formed with a negligible spring constant when compared with the spring constant of the main spring 65. The centering springs 75 serve the additional function of supplying electrical energy to the drive coil 73 of the driver 72. For this purpose, lead wires 95 are connected electrically by the brackets 76 to the springs which are, in turn, connected electrically with the drive coil 73.

The mirror 58 has a reflecting surface for directing light (or other rays) to a parabolic mirror, not shown, for condensing rays into a beam directed through an opening 58a in the mirror and through a variable iris diaphragm 77 having a mounting bracket which is secured to the extended end of the shaft 51. The purpose of the variable iris diaphragm is to provide a constant viewing area at all scan angles of the mirror. To attain this goal, the azimuth opening, i.e., sidewise perpendicular to the direction of satellite travel, is controlled independently of the elevation opening, i.e., in the direction of satellite travel. The opening is square at nadir. Azimuth is closed more than elevation as the scan angle increases from nadir.

Figure 6:
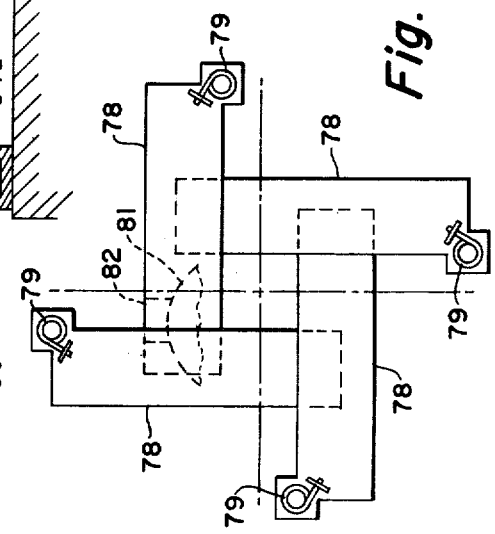
FIG. 6 is a schematic illustration of a rotation controlled iris diaphragm.

FIG. 6, illustrates in greater detail, one form of iris diaphragm 77. Four thin plates or blades 78 are pivotally attached by pins 79 to the tube 54 symmetrically at essentially the vertical and horizontal axes of the viewing aperture. It is pointed out that the blades are hinged on the driven body supporting the scanning mirror 58. An iris actuating attachment consists of, for each blade, a cam 81, only one being shown in the drawings, attached to the foundation mounted to shaft 51. A rider 82 on each blade contacts the surface of the cam which causes it to open or close its edge defining the aperture as required by the chosen orbit or operational requirement. The blade hinge pins 79 are actually formed as hinge springs which hold the rider 82 against the cams 83. The pin 79 could, if desired, take the form of conventional bearings in which event a coil spring may be employed to draw the riders into contact with the cams.

Figure 7:
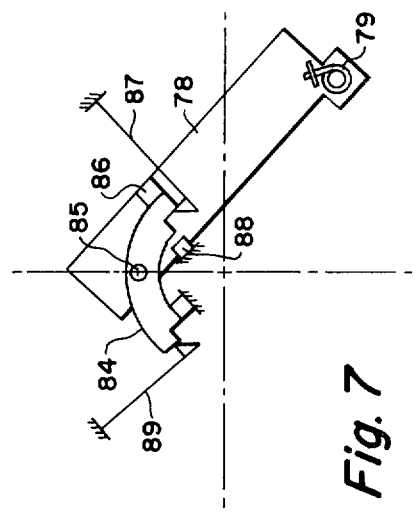
FIG. 7 is a schematic illustration of a modified form of a rotation controlled iris diaphragm.
Figure 8:
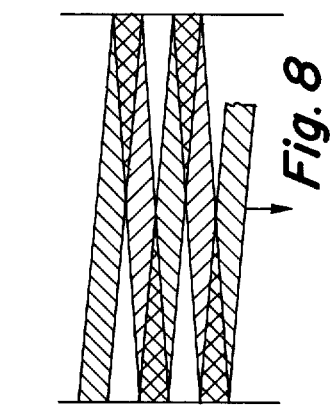
FIG. 8 is a representation of the scanning lines across a scene produced by the oscillating scanner according to the present invention without employing an iris diaphragm.

FIG. 7 illustrates an additional feature for an iris diaphragm control which relates to a motion compensating device. For a better understanding of the purpose of this device, if one were to assume, for example, being located in the satellite and looking toward the earth and scanning a scene from horizon-to-horizon. If the line of sight of the viewer contains an adjustable aperture as shown in FIG. 6, one would see a field of view defined at an angle to the direction of travel, because of the velocity of the satellite. It is important to note that, as illustrated in FIG. 8, the view scanned between the horizons has certain overlapping areas and further that the view during each scan omits certain other areas between the scanned lines. The arrow in FIG. 8 indicates the direction of spacecraft travel. The motion compensating device illustrated in FIG. 7 relates to modifying the viewing angle such that the viewer actually looks in a backward direction in relation to the direction of spacecraft travel during each scan. In this manner, the field of view is maintained perpendicular to the direction of spacecraft travel during each scan.

In FIG. 7, the mechanism illustrated includes a cam 84 similar to the cam described with respect to FIG. 6 but that the cam 84 is pivotally attached by a bearing 85 to the shaft 51, FIG. 9, such that the cam can rotate about its pivot point at the end of each scan to produce a slope displacement of the blade so as to straighten out the field of view as described above. It is important to note with respect to FIG. 7, that the pin 79 for the blade is rotating in a clockwise direction at the instant shown in FIG. 7. At an instant later in time than that shown in FIG. 7, a rider 86 will strike a spring biased holding finger 87 and spring the finger to the right, as one views FIG. 7, to unlatch the finger from the cam. The spring force exerted on the blade by the spring pin 79 will cause the cam to rotate clockwise until it contacts a right-hand stop 88 attached to the foundation, e.g., shaft 51 in FIG. 9. Following this, a left-hand holding finger 89 which has a spring biasing force urging it toward the cam, will snap under the cam 84 and hold the cam while the rider travels toward it. This triggers the cam to repeat a motion sequence similar to that just described at the right of the cam. This motion compensating device is only required for two blades which form the elevation, in the direction of satellite travel for the aperture.

Returning now to FIG. 9, after the light beam passes through the iris opening, it travels along the internal bore formed in the shaft 51 toward the foundation of the spacecraft which may be conveniently formed as a wall or the like structure. A light sensor 91 is held by brackets 92 to the foundation of the spacecraft such that the sensor 91 is in axial alignment with the light beam in the shaft 51. Those skilled in the art will appreciate that the sensor 91 may be designed to produce an electrical signal in response to changing energy levels of rays other than that light rays, which were specifically referred to herein for descriptive purposes only.

In order to initiate an oscillation motion to the scanner, a pulse command signal is delivered from a controller 93 to a power supply 94 which is connected to one of the electrical lines 95 for the driver 72. After the mechanism is set into motion, a position feedback system is employed to maintain single harmonic oscillations with a desired constant amplitude and frequency. This may be accomplished by any one of several known means such as, for example, by providing a second winding in the coil 73 to produce a feedback signal to controller 90 proportional to the relative motion between the coil 73 and the permanent magnet 74. After the oscillating motion is initiated, torque is supplied to the primary or driven body defined by the rim 56, wall 55, mirror 58 and pedestals 57. The torque supplied to oscillate this body produces a counter-oscillation in the counter-balance or reaction body defined by the rims 59 and 64 and wall 63 since the counterbalance body is interconnected with the primary body by the spiral spring 65. This produces a concentric counter-rotation between the rims 56 and 64 which oscillate with a motion preferably defined by the natural frequency of these two bodies connected between the ends of the spring 65. Since these two bodies can be designed in a manner to have substantially equal moments of inertia, the elastic restoring force of the spring 65 can be utilized without incurring a net angular momentum on the foundation which, if incurred, may affect the altitude of the spacecraft or satellite. In the alternative, the two bodies do not have to be of equal moments of inertia. For example, if the counterweight was of one-half the moment of inertia of the mirror support system, the counterweight would oscillate through twice the angle of the mirror system without transfer of net momentum to the foundation. It has been found practical to design them with almost the same moments of inertia because of spring design considerations. The driver 72 is employed to supply the lost energy due to the bearing friction and inefficiencies of the system so as to maintain the oscillations at their natural frequency.

In FIG. 10, there is illustrated a composite graph consisting of three curves. Curve 100 represents a time versus the displacement of the mirror from the nadir position; i.e., its center position. This curve depicts an oscillation with simple harmonic motion which conforms to a typical sine-wave curve. The second graph contains a curve 101 to represent the velocity of the mirror with respect to the nadir position. The oscillations occur with a phase relation such that the mirror velocity is maximum when the displacement from the nadir position is zero and that the mirror velocity reduces to zero with a displacement from the nadir position. The third graph contains a curve 102 that represents time versus the torque input by the driver to the oscillating scanner. It is preferred to supply this input torque in a phased relation with the velocity of the mirror such that the input torque is maximum when the velocity is maximum and the input torque is zero when the velocity reduces to zero. This has the added advantage of maintaining the oscillations within an accurate and precise amplitude without departing from the natural frequency of the oscillating body.

FIG. 11 illustrates a typical form damping system to eliminate unwanted random vibrations of the main spring 65 shown in FIG. 9. Such vibrations are dampened by employing one or more dampers, each in the form of a spring 105 attached at one end to the outer convolution of the main spring 65. The free end of the spring 105 is connected to a piston of a dashpot assembly 106 attached to the rim 64. This system is particularly useful to dampen out harmonic vibrations between the convolutions of the spring 65. It is preferred to form the spring 105 with a very low spring constant in relation to the spring 65.

Although the invention has been shown in connection with certain specific embodiments, it will be readily apparent to those skilled in the art that various changes in form and arrangement of parts may be made to suit requirements without departing from the spirit and scope of the invention.

We claim as our invention:

1. An oscillating scanner comprising:
    a sensor for producing an electrical signal in response to rays having varying energy levels;
    reflective means for directing said rays onto said sensor;
    a primary body carrying said reflective means for movement about an oscillation axis passing through said primary body;
    bearing support means rotatably carrying said primary body for oscillating motion of said reflective means and said primary body about said oscillation axis;
    a reaction body having a moment of inertia bearing a predetermined proportional relation to the moment of inertia defined by the combination of said reflecting means and said primary body;
    bearing support means rotatably carrying said reaction body for oscillating motion by said reaction body about said oscillation axis;
    spring means interconnecting said primary body and said reaction body for supplying an elastic restoring force to produce sustained harmonic oscillations of said reflective means about said oscillation axis while said reaction body oscillates; and
    driver means for generating a relative torque between said primary body and said reaction body in a manner to compensate for losses to said elastic restoring force to thereby maintain harmonic oscillations of said reflective means at a predetermined frequency and amplitude.

2. An oscillating scanner according to claim 1 further comprising support means including a shaft supporting one of said bearing means.

3. An oscillating scanner according to claim 2 wherein said support means further includes a foundation structure of a satellite carrying said shaft, said support means being constructed and arranged to support said primary body and said reflective means for harmonic oscillations at an amplitude greater than 10° and upward of one radian.

4. An oscillating scanner according to claim 1 wherein said driver means further comprises a first flux producing member carried by said primary body, and a second flux producing member carried by said reaction body.

5. An oscillating scanner comprising:
a sensor for producing an electrical signal in response to rays having varying energy levels;
reflecting means for directing said rays onto said sensor;
an oscillation body carrying said reflective means for movement about an oscillation axis passing through said body;
bearing support means rotatably carrying said body for oscillating motion of said reflective means and said body about said oscillation axis;
spring means coaxial with said oscillation axis and connected at one end to said body for supplying an elastic restoring force to produce sustained harmonic oscillations of said reflective means about said oscillation axis;
support means connected to the other end of said spring means to absorb the reaction force to said elastic restoring force, said support means carrying said bearing support means, and
driver means for generating a relative torque between body and said support means in a manner to compensate for losses to said elastic restoring force to thereby maintain harmonic oscillation of said reflective means at a predetermined frequency and amplitude.

6. An apparatus according to claim 4 further comprising control means for one of said flux producing members to develop a torque in a phased relation with the oscillation frequency of said reflecting means.

7. An apparatus according to claim 6 further comprising an iris diaphragm having a plurality of plates defining an opening arranged in an aligned relation with said sensor, and means for producing relative displacement of said plates to change said opening in response to the oscillations of said reflecting means.

8. An apparatus according to claim 7 further comprising means for damping random vibrations of said spring means.

9. An apparatus according to claim 8 wherein said means for damping random vibrations include a coil spring secured to said spring means, and a dashpot interconnecting said coil spring to said reaction body.

10. An apparatus according to claim 5 wherein said driver means further comprises a first flux producing member engaging said oscillating body, and a second flux producing member engaging said support means.

11. An apparatus according to claim 10 further comprising control means for one of said flux producing members to develop a torque in a phased relation with the oscillation frequency of said reflecting means.

12. An apparatus according to claim 11 wherein said support means includes foundation structure of a satellite for supporting said oscillating body, said support means being constructed and arranged to support said oscillating body and reflective means for oscillations greater than 10° and upwards of one radian.

* * * * *